(12) United States Patent
Müller et al.

(10) Patent No.: US 8,790,753 B2
(45) Date of Patent: Jul. 29, 2014

(54) RUBBER MATERIAL WITH BARRIER MATERIAL MADE OF CYCLOOLEFIN COPOLYMERS

(75) Inventors: Kevin Müller, Heppenheim (DE); Stefan Dahmen, Freinsheim (DE)

(73) Assignee: BASF SE, Ludwigshafen (DE)

(*) Notice: Subject to any disclaimer, the term of this patent is extended or adjusted under 35 U.S.C. 154(b) by 251 days.

(21) Appl. No.: 13/370,987

(22) Filed: Feb. 10, 2012

(65) Prior Publication Data

US 2012/0205022 A1   Aug. 16, 2012

Related U.S. Application Data

(60) Provisional application No. 61/441,705, filed on Feb. 11, 2011.

(51) Int. Cl.
  *B05D 1/02* (2006.01)
  *B05D 3/00* (2006.01)
  *C08L 65/00* (2006.01)

(52) U.S. Cl.
  USPC ............ 427/393.5; 427/427.6; 264/175; 524/554; 525/211; 525/933

(58) Field of Classification Search
  USPC ........... 525/211, 216, 933; 524/554; 152/510, 152/564; 427/393.5, 427.6; 264/175
  See application file for complete search history.

(56) References Cited

U.S. PATENT DOCUMENTS

| | | | |
|---|---|---|---|
| 3,778,420 A | 12/1973 | Brown et al. | |
| 4,025,708 A | 5/1977 | Minchak et al. | |
| 4,239,874 A * | 12/1980 | Ofstead et al. | 526/143 |
| 2007/0037940 A1 | 2/2007 | Lazzari et al. | |
| 2008/0234451 A1 | 9/2008 | Kenwright et al. | |
| 2010/0324248 A1 * | 12/2010 | Pawlow et al. | 526/318.2 |
| 2011/0129644 A1 | 6/2011 | Rule et al. | |
| 2012/0058332 A1 | 3/2012 | Müller et al. | |
| 2012/0118465 A1 * | 5/2012 | Majumdar et al. | 152/510 |

FOREIGN PATENT DOCUMENTS

| | | |
|---|---|---|
| DE | 198 59 191 A1 | 6/2000 |
| EP | 0 488 135 A2 | 6/1992 |
| EP | 0 824 125 A1 | 2/1998 |
| EP | 1 847 558 A1 | 10/2007 |
| WO | WO 93/20111 A2 | 10/1993 |
| WO | WO 96/04289 A1 | 2/1996 |
| WO | WO 97/03096 A1 | 1/1997 |
| WO | WO 97/06185 A1 | 2/1997 |
| WO | WO 00/46255 A1 | 8/2000 |
| WO | WO 02/26858 A1 | 4/2002 |
| WO | WO 2009/154849 A1 | 12/2009 |
| WO | WO 2011/051374 A1 | 5/2011 |
| WO | WO 2012/028530 A1 | 3/2012 |

OTHER PUBLICATIONS

U.S. Appl. No. 61/257,063, filed Nov. 2, 2009, Mueller, et al.
U.S. Appl. No. 13/503,548, filed Apr. 23, 2012, Mueller, et al.
U.S. Appl. No. 13/222,573, filed Aug. 31, 2011, Kevin Mueller, et al.
International Search Report and Written Opinion issued May 25, 2012 in PCT/EP2012/051992 filed Feb. 7, 2012 with English translation of Category of Cited Documents.

* cited by examiner

*Primary Examiner* — Fred M Teskin
(74) *Attorney, Agent, or Firm* — Oblon, Spivak, McClelland, Maier & Neustadt, L.L.P.

(57) ABSTRACT

A rubber material is described, modified with a barrier material in the form of a copolymer which can be produced via ring-opening metathesis polymerization of a) at least one olefin monomer selected from the group consisting of monocyclic olefin monomers having one or two endocyclic C—C double bonds and bicyclic olefin monomers having one endocyclic C—C double bond and b) at least one polycyclic olefin monomer having at least two C—C double bonds. The barrier material can be used to reduce the gas permeability of the rubber material.

10 Claims, No Drawings

RUBBER MATERIAL WITH BARRIER MATERIAL MADE OF CYCLOOLEFIN COPOLYMERS

The invention relates to a rubber material modified with a barrier material in the form of a copolymer which can be produced via ring-opening metathesis polymerization (ROMP) of a) olefin monomers selected from monocyclic olefin monomers having one or two endocyclic C—C double bonds and bicyclic olefin monomers having one endocyclic C—C double bond and b) polycyclic olefin monomers having at least two C—C double bonds.

An important factor in pneumatic tires is to ensure that the compressed air or the filler gas has the required pressure value and the necessary gas volume to maintain tire operation with functional capability for a maximum period. For this reason, the interior of conventional pneumatic tires usually has a gas-impermeable rubber layer or a rubber layer with minimum gas permeability. Said inner layer of a tire serves to seal the gas-filled interior and in tubeless tires acts as replacement for the tube. An example of a material that can be used is halobutyl-containing, vulcanizable rubber mixture, or butyl rubber.

Ring-opening metathesis polymerization reactions are described in EP 1847558 A1 and in the U.S. patent application 61/257,063. Homopolymers produced via ring-opening metathesis polymerization from cycloolefins, starting from cyclooctene or from cyclopentadiene, are often brittle, thermoset, or non-film-forming materials which are not suitable for forming flexible coatings or which have poor barrier properties, or the glass transition temperature of which cannot be adjusted to the desired value.

It was an object of the present invention to provide alternative barrier materials for rubber products, in particular for pneumatic tires, where these can be used simply, efficiently and at low cost and/or have good or improved gas-barrier properties.

The invention provides a rubber material modified with a barrier material in the form of a copolymer which can be produced via ring-opening metathesis polymerization of
a) at least one olefin monomer selected from the group consisting of monocyclic olefin monomers having one or two endocyclic C—C double bonds and bicyclic olefin monomers having one endocyclic C—C double bond and
b) at least one polycyclic olefin monomer having at least two C—C double bonds.

It is preferable to use the copolymer in the form of a polymer layer of thickness at least 1 μm. It is preferable that the molar ratio of olefin monomers a) to polycyclic olefin monomers b) is from 99:1 to 15:85 or from 80:20 to 15:85.

The invention also provides a pneumatic tire comprising a rubber material of the invention.

The invention also provides a process for modifying a rubber material with gas-barrier properties, where at least one of the abovementioned copolymers, described in more detail below, is applied to the rubber material or is introduced into the rubber material.

The invention also provides the use of the abovementioned copolymers, described in more detail below, for reducing the gas permeability of rubber material.

The rubber material provided with the copolymer in the invention exhibits a gas-barrier property (e.g. with respect to air, oxygen, nitrogen, argon, carbon dioxide, etc.), and this barrier property is generated or amplified via the use of the copolymer in the invention. The expression "barrier property" means, in comparison with uncoated backing substrate, reduced transmission or permeability with respect to certain substances. Oxygen- or gas-barrier properties can by way of example be measured by the permeability test described in the examples. It is preferable that the oxygen transmission rate for substrates coated in the invention is less than 30% of the value for the untreated substrates, in particular less than 15% or less than 5%, e.g. from 0.1% to 3% (measured at 23° C. and 85% relative humidity).

The copolymers used in the invention can be produced via ring-opening metathesis polymerization. A metathesis reaction is very generally a chemical reaction between two compounds where a group is exchanged between two reactants. If this is an organic metathesis reaction, it can be formally represented as exchange of the substituents at a double bond. However, a particularly important reaction is the metal-complex-catalyzed ring-opening metathesis reaction of organic cycloolefin compounds ("ring opening metathesis polymerization", abbreviated to ROMP), where this provides access to polymeric polyolefins. Catalytic metal complexes used are in particular metal carbene complexes of the general structure Met=$CR_2$, where R is an organic moiety. The metal carbene complexes are very susceptible to hydrolysis, and the metathesis reactions can therefore be carried out in anhydrous organic solvents or in the olefins themselves (see by way of example U.S. Provisional 2008234451, EP-A 0824125). It is also possible to carry out the metathesis reaction of olefins in an aqueous medium in order to avoid complicated purification steps for the removal of large amounts of solvents or unreacted olefins (DE 19859191; U.S. patent application 61/257,063).

The copolymers used in the invention are formed from
a) at least one olefin monomer selected from the group consisting of monocyclic olefin monomers having one or two endocyclic C—C double bonds and bicyclic olefin monomers having one endocyclic C—C double bond and
b) at least one polycyclic olefin monomer having at least two C—C double bonds.

The molar ratio of olefin monomers a) to polycyclic olefin monomers b) is preferably from 80:20 to 15:85, preferably from 65:35 to 20:80.

The ring strain of the olefin monomers a) is preferably at least 2 kcal/mol. The ring strain of the polycyclic olefin monomers b) is preferably at least 15 kcal/mol, based on the ring with the highest strain.

Examples of olefin monomers a) are cyclobutene, cyclopentene, 2-methylcyclopentene-1,3-methylcyclopentene-1, 4-methylcyclopentene-1,3-butylcyclopentene-1, cyclohexene, 2-methylcyclohexene-1,3-methylcyclohexene-1,4-methylcyclohexene-1,1,4-dimethylcyclo-hexene-1,3,3,5-trimethylcyclohexene-1, cycloheptene, 1,2-dimethylcycloheptene-1, cis-cyclooctene, trans-cyclooctene, 2-methylcyclooctene-1,3-methylcyclooctene-1,4-methylcyclooctene-1,5-methylcyclooctene-1, cyclononene, cyclodecene, cycloundecene, cyclododecene, cyclooctadiene, cyclopentadiene, cyclohexadiene and norbornene, and particular preference is given here to monocyclic olefins having one C—C double bond, in particular cis-cyclooctene.

Preferred polycyclic olefin monomers b) are bicyclic dienes, e.g. norbornadiene, dicyclopentadiene (3a,4,7,7a-tetrahydro-1H-4,7-methanoindene), bicyclo[2.2.2]octa-2,5-diene, bicyclo[3.3.0]octa-2,6-diene, and cyclopentadiene oligomers, e.g. tricyclopentadiene. Particular preference is given to dicyclopentadiene.

In one preferred embodiment, the copolymer has been formed via ring-opening metathesis polymerization of cis-cyclooctene and dicyclopentadiene.

The copolymers used in the invention are preferably produced in an aqueous medium. The ring-opening metathesis reaction here can be carried out by using water and dispersing agent as initial charge in a polymerization vessel, dissolving an organometallic carbene complex used as catalyst in the cycloolefin, introducing the cycloolefin/metal complex solution into the aqueous dispersing agent solution, converting the resultant cycloolefin/metal complex macroemulsion to a cyclocolefin/metal complex miniemulsion, and converting this at room temperature to an aqueous polyolefin dispersion. In a preferred method for carrying out the ring-opening metathesis reaction, at least one portion of the water, at least one portion of dispersing agent, and at least one portion of the monomers in the form of an aqueous monomer macroemulsion with an average droplet diameter ≥2 µm are used as initial charge, and then the monomer macroemulsion is converted to a monomer miniemulsion with an average droplet diameter ≤1500 nm, with introduction of energy, and then the optionally remaining residual amount of the water, the optionally remaining residual amount of the dispersing agent, the optionally remaining residual amount of the monomers, and the entire amount of an organometallic carbene complex used as catalyst are added to the resulting monomer miniemulsion at polymerization temperature.

Organometallic carbene complexes can be used as metathesis catalysts. Examples of metals are transition metals of the 6th, 7th, or 8th transition group, preferably molybdenum, tungsten, osmium, rhenium, or ruthenium, of which osmium and ruthenium are preferred. It is particularly preferable to use ruthenium alkylidene complexes. These metathesis catalysts are known from the prior art and are described by way of example in R. H. Grubbs (Ed.) "Handbook of Metathesis", 2003, Wiley-VCH, Weinheim, WO 93/20111, WO 96/04289, WO 97/03096, WO 97/06185, J. Am. Soc. 1996, pp. 784-790, Dalton Trans. 2008, pp. 5791-5799, and in Coordination Chemistry Reviews, 2007, 251, pp. 726-764.

The concentration of the copolymers in the aqueous dispersions or solutions used for the coating process is preferably at least 1% by weight, in particular at least 5% by weight, and up to 50% by weight, or up to 70% by weight. The content of the copolymers in the aqueous dispersion is mostly from 10 to 60% by weight, or from 15 to 55% by weight, in particular from 20 to 50% by weight.

The viscosity of preferred aqueous dispersions of the copolymers at pH 4 and at a temperature of 20° C. is from 10 to 150 000 mPas, or from 200 to 5000 mPas (measured by a Brookfield viscosimeter at 20° C., 20 rpm, spindle 4). The average particle size of the copolymer particles dispersed in the aqueous dispersion is by way of example from 0.02 to 100 µm, preferably from 0.05 to 10 µm. It can be determined by way of example with the aid of optical microscopy, light scattering, hydrodynamic chromatography, or freeze-fracture electron microscopy.

The rubber constituents of the rubber material can by way of example have been selected from diene rubber, natural rubber, butyl rubber, synthetic polyisoprene, polybutadiene, styrene-butadiene copolymer, isoprene-butadiene rubber, styrene-isoprene-butadiene rubber, acrylonitrile-butadiene rubber, ethylene-propylene rubber, and chloroprene rubber.

The rubber material is preferably a constituent of a pneumatic tire, in particular being an inner layer of a pneumatic tire, or being a carcass of a pneumatic tire.

In one embodiment, the rubber materials themselves are modified with a solution or aqueous dispersion of at least one of the copolymers described above. In another embodiment, constituents of a rubber-containing article, in particular of pneumatic tires, are modified with the barrier material and are introduced into the rubber-containing article, preferably pneumatic tire. By way of example, the textile cord insert of pneumatic tires can be modified with the copolymers to be used in the invention.

The invention also provides a process for modifying a rubber material, where at least one of the copolymers described herein is applied to the rubber material or is incorporated into the rubber material. The modification can by way of example use one or more of the following methods: impregnation, spraying, spreading, coating, calendering. The dispersions or solutions used for the coating process can comprise further additives or auxiliaries, e.g. thickeners to adjust rheology, wetting aids, organic or inorganic fillers, or binders.

It is preferable that the copolymer is applied in the form of an aqueous dispersion of the copolymer, and a film is formed via drying of the dispersion on the backing substrate.

The invention also provides a pneumatic tire comprising a rubber material of the invention. The copolymer here can have been applied by one or more of the following methods:
   application on at least one portion of the surface or on the entire surface of the inner layer of the tire;
   introduction into the material of the inner layer of the tire;
   in the form of film, in the form of unsupported foil, or in the form of coating of a foil backing, where the films or foils can have been introduced in addition to a rubber-based inner layer of a tire or as replacement form for an inner layer of a tire, into the interior of a tire;
   in the form of binder or coating of a fiber cord insert of the pneumatic tire;
   in the form of laminate between two or more backing foils, where the laminate has been introduced into the interior of the tire.

A film applied can take the form of spray film or of spread film, for example through roll-, doctor-, airbrush-, or cast-spreading processes. The material applied can also take the form of a foil which serves as backing and then is crosslinked (vulcanized) or adhesive-bonded to the carcass. Examples of suitable foil backings are those made of rubber, of polyolefin, of polyester, of polyamide, or of polyurethane.

As an alternative, it is also possible to use the copolymer in the form of a laminate between two backing foils, where the laminate is then crosslinked or adhesive-bonded to the carcass.

The copolymers can also be used in the form of self-supporting film.

The application process can by way of example be undertaken on coating machines, by applying the coating composition to a backing foil made of a plastic. If materials are used in the form of webs, the polymer dispersions is usually applied from a trough by way of an applicator roll, and rendered uniform by an airbrush.

Examples of other successful methods of applying the coating use the reverse gravure process, or use spray processes, or use a metering bar, or use other coating processes known to the person skilled in the art. The backing substrate here has a coating on at least one side, i.e. can have a coating on one or both sides.

In order to achieve a further improvement in adhesion on a foil, the backing foil can be subjected in advance to a corona treatment or, as an alternative, adhesion promoters, such as polyethyleneimines, can be used. The amounts applied to the sheet materials are preferably by way of example from 1 to 800 g (of polymer, solid) per $m^2$, preferably from 1 to 400 $g/m^2$, or from 5 to 200 $g/m^2$. Once the coating compositions have been applied to the backing substrates, the solvent or dispersion medium is evaporated. To this end, it is possible by way of example in the case of continuous operation to pass the material through a drying tunnel which can have an infrared irradiation apparatus. The coated and dried material is then passed over a cooling roll and finally is wound up. The thickness of the dried coating is at least 1 μm preferably from 1 to 400 μm, particularly preferably from 5 to 200 μm. The thickness of the backing foils is generally in the range from 10 μm to 1 cm.

The substrates coated in the invention exhibit excellent gas-barrier effect.

EXAMPLES

The following copolymer dispersions were used (monomer ratios are based on molar ratios):

Dispersion D1:
30% strength aqueous poly(dicyclopentadiene-co-octenamer) dispersion, produced via ring-opening metathesis polymerization (ROMP) starting from dicyclopentadiene and cis-cyclooctene (50:50) with use of a ruthenium-alkylidene catalyst.

Number-average particle size: 270 nm

Dispersion D2:
30% strength aqueous poly(dicyclopentadiene-co-octenamer) dispersion, produced via ring-opening metathesis polymerization (ROMP) starting from dicyclopentadiene and cis-cyclooctene (60:40) with use of a ruthenium-alkylidene catalyst.

Dispersion D3:
30% strength aqueous poly(dicyclopentadiene-co-octenamer) dispersion, produced via ring-opening metathesis polymerization (ROMP) starting from dicyclopentadiene and cis-cyclooctene (70:30) with use of a ruthenium-alkylidene catalyst.

Dispersion D4:
40% strength aqueous poly(dicyclopentadiene-co-octenamer) dispersion, produced via ring-opening metathesis polymerization (ROMP) with use of a ruthenium-alkylidene catalyst starting from dicyclopentadiene and cis-cyclooctadiene (50:50).

Number-average particle size of dispersed latex particles: 265 nm

Dispersion D5:
30% strength aqueous poly(dicyclopentadiene-co-octenamer) dispersion, produced via ring-opening metathesis polymerization (ROMP) with use of a ruthenium-alkylidene catalyst starting from dicyclopentadiene and cis-cyclooctene (2:98).

Number-average particle size of dispersed latex particles: 419 nm

Determination of Oxygen Permeability of a Self-Supporting Polyalkenamer Foil:

The foil was produced by casting a polyalkenamer dispersion into a silicone mold of dimensions 15 cm×10 cm×0.5 cm (length×width×height). The cast dispersion film was dried at 25° C. for 48 h and then heat-conditioned at a temperature of 65° C. for 10 minutes.

Dry and moist oxygen permeabilities were measured with a MOCON OXTRAN® 2/21, the measurement principle of which is based on the carrier-gas method (ASTM D3985). In the carrier-gas method, the masked specimen films (without supportive material) with a surface area which in this case is 5 cm$^2$ are incorporated into an airtight cell with a cavity on both sides. A carrier gas (95% of $N_2$ and 5% of $H_2$) is passed over one side of the specimen and the measurement gas (100% of $O_2$) is passed over the other side of the specimen, in both cases at atmospheric pressure. The measurement gas that diffuses through the specimen is absorbed by the carrier gas and conducted to a coulometric sensor. Oxygen concentration can thus be determined as a function of time. All measurements were carried out at 23° Celsius and at a defined relative humidity (RH). Both sides of the specimen were exposed to the defined humidity. Conditioning of the equipment and of the specimen took about half an hour. The machine running time for the measurements was from 1 to 4 days. Two determinations were carried out on each specimen. For the purposes of the tests, the transmission rate ($cm^3/(m^2*day)$) of the specimen was standardized to 1 μm and 1 bar, using the average thickness of the foil, which was measured at 5 different points. This standardization gave the permeation rate [$cm^3$ μm/($m^2*day*bar$)].

A first measurement determined oxygen permeability under dry conditions. A second measurement determined oxygen permeability under moist conditions (85% relative humidity). Table 1 lists the results. The thickness of the foils was 386.8 μm.

TABLE 1

Oxygen permeability of a self-supporting polyalkenamer foil

| Specimen | Transmission rate, 23° C., dry [$cm^3/$ ($m^2$ * day)] | Permeation rate, 23° C., dry [$cm^3$μm/ ($m^2$ * day * bar)] | Transmission rate, 23° C., 85% RH [$cm^3/$ ($m^2$ * day)] | Permeation rate, 23° C., 85% RH [$cm^3$μm/ ($m^2$ * day * bar)] |
|---|---|---|---|---|
| D1 | 0.272 | 104.8 | 0.254 | 98.247 |

Determination of Water-Vapor Permeability of a Self-Supporting Polyalkenamer Foil:

The foil was produced as described above. Water-vapor permeabilities were measured at 85% relative humidity by a MOCON PERMATRAN-W® 3/33, the measurement principle of which is likewise based on the carrier-gas method. The equipment operates in accordance with ASTM F1249. In the carrier-gas method, the masked specimen films (without supportive material) with a surface area which in this case is 5 cm$^2$ are incorporated into an airtight cell with a cavity on both sides. A carrier gas (dry $N_2$) is passed over one side of the specimen and the measurement gas ($N_2$+water vapor) is passed over the other side of the specimen, in both cases at atmospheric pressure. The measurement gas that diffuses through the specimen is absorbed by the carrier gas and conducted to a selective sensor. In the case of water-vapor-measurement equipment, an IR sensor is used. This permits determination of water-vapor concentration as a function of time. The measurements were carried out at 23° Celsius. Conditioning of the equipment took about 30 minutes. Machine running time for all of the measurements was from 1 to 4 days. The transmission rate of the specimen was measured with relative humidity adjusted with maximum precision to 85%, and the small metrological error in humidity adjustment was then computer-corrected. It was assumed here that there is a linear correlation between the transmission rate and the relative humidity within the range of measurement. For the purposes of the tests, the transmission rate (g/($m^2*day$)) of the specimen was standardized, using the average thickness of the foil, which was determined at 5 different points. This standardization gave the permeation rate (g*μm/($m^2*day$)). Table 2 lists the results. The thickness of the foils was 320 μm.

TABLE 2

| | Water-vapor permeability of a self-supporting polyalkenamer foil | |
|---|---|---|
| Specimen | Transmission rate, 23° C., 85% RH [g/(m² * day)] | Permeation rate, 23° C., 85% RH [g*μm/(m² * day)] |
| D1 | 3.76 | 1203 |

Determination of Oxygen Permeability of a Polyalkenamer-Coated Rubber Foil

The effect of the oxygen barrier was measured via determination of oxygen transmission of a poly(dicyclopentadiene-co-octenamer)-coated natural rubber substrate. The oxygen barrier was measured with a MOCON OXTRAN® 2/21, the measurement principle of which is based on the carrier-gas method (ASTM D3985). The measurement was made at 23° C., using synthetic air (21% of oxygen). Two determinations were carried out on each specimen. Oxygen-barrier effect was measured at relative humidity of 0% and 85%.

Specimen 1:
Uncoated natural rubber (Erwin Telle GmbH, Nuremberg),
Substrate thickness: 346 μm Specimen 2:
A natural rubber substrate (Erwin Telle GmbH, Nuremberg) of thickness 346 μm was cleaned with ethanol and coated with poly(dicyclopentadiene-co-octenamer) of dispersion D1, dried at 50° C. for 10 min, and then stored at room temperature for 7 days. The thickness of the poly(dicyclopentadiene-co-octenamer) coating on the natural rubber substrate was 8 μm.

Table 3 collates the results for oxygen-barrier effect:

TABLE 3

| Specimen | Transmission rate [cm³/(m² * day)], 0% relative humidity | Transmission rate [cm³/(m² * day)], 85% relative humidity |
|---|---|---|
| Specimen 1 | 5010 | 5080 |
| Specimen 2 | 66.1 | 93.5 |

The invention claimed is:

1. A process for modifying a rubber material, comprising applying a copolymer to a rubber material or introducing the copolymer into the rubber material, wherein the copolymer is obtained by ring-opening metathesis polymerization of
   at least one olefin monomer selected from the group consisting of a monocyclic olefin monomer having one or two endocyclic C—C double bonds and a bicyclic olefin monomer having one endocyclic C—C double bond, and
   a polycyclic olefin monomer having at least two C—C double bonds, and
   wherein the modifying comprises at least one selected from the group consisting of impregnating, spraying, spreading, coating, and calendering.

2. A process for modifying a rubber material, comprising applying a copolymer to a rubber material, wherein the copolymer is obtained by ring-opening metathesis polymerization of
   at least one olefin monomer selected from the group consisting of a monocyclic olefin monomer having one or two endocyclic C—C double bonds and a bicyclic olefin monomer having one endocyclic C—C double bond, and
   a polycyclic olefin monomer having at least two C—C double bonds, and
   wherein the copolymer is applied in the form of an aqueous dispersion of the copolymer and a film is formed via drying of the dispersion on a backing substrate.

3. A process for reducing the gas permeability of a rubber material, comprising applying a copolymer to the rubber material wherein the copolymer is obtained by ring-opening metathesis polymerization of
   at least one olefin monomer selected from the group consisting of a monocyclic olefin monomer having one or two endocyclic C—C double bonds and a bicyclic olefin monomer having one endocyclic C—C double bond, and
   a polycyclic olefin monomer having at least two C—C double bonds.

4. The process according to claim 3, wherein the copolymer is in the form of an aqueous dispersion of the copolymer, wherein the copolymer is suitable for producing a barrier film.

5. The process according to claim 3, wherein either a molar ratio of the olefin monomer to the polycyclic olefin monomer is from 80:20 to 15:85,
   a layer thickness of the copolymer is at least 1 μM, or both.

6. The process according to claim 5, wherein a molar ratio of the olefin monomer to the polycyclic olefin monomer is from 80:20 to 15:85.

7. The process according to claim 5, wherein a layer thickness of the copolymer is at least 1 μM.

8. The process according to claim 5, wherein a molar ratio of the olefin monomer to the polycyclic olefin monomer is from 80:20 to 15:85 and a layer thickness of the copolymer is at least 1 μm.

9. The process according to claim 1, comprising applying the copolymer to the rubber material.

10. The process according to claim 1, comprising introducing the copolymer into the rubber material.

* * * * *